US007676420B1

(12) United States Patent
Agnew et al.

(10) Patent No.: US 7,676,420 B1
(45) Date of Patent: Mar. 9, 2010

(54) ELECTRONIC SETTLEMENT OF PETROLEUM AND GAS DISTRIBUTIONS

(75) Inventors: Thomas J. Agnew, Dallas, TX (US); Frank D. Agnew, Metairie, LA (US)

(73) Assignee: Accenture Global Services GmbH (CH)

( * ) Notice: Subject to any disclaimer, the term of this patent is extended or adjusted under 35 U.S.C. 154(b) by 2028 days.

(21) Appl. No.: 10/465,296

(22) Filed: Jun. 19, 2003

Related U.S. Application Data (60) Provisional application No. 60/389,822, filed on Jun. 19, 2002.

(51) Int. Cl.
*G06Q 40/00* (2006.01)

(52) U.S. Cl. .......................... 705/37; 73/861.01; 702/9; 166/267; 166/252.2; 166/266; 138/139; 705/1

(58) Field of Classification Search ........................ None
See application file for complete search history.

(56) References Cited

U.S. PATENT DOCUMENTS

| | | | | |
|---|---|---|---|---|
| 5,297,423 | A * | 3/1994 | Keating et al. ................ 73/49.2 |
| 5,383,113 | A | 1/1995 | Kight et al. |
| 5,873,072 | A | 2/1999 | Kight et al. |
| 5,880,446 | A * | 3/1999 | Mori et al. .................... 235/380 |
| 5,983,164 | A * | 11/1999 | Ocondi ........................ 702/12 |
| 6,055,567 | A | 4/2000 | Ganesan et al. |
| 6,161,905 | A * | 12/2000 | Hac et al. .................... 303/146 |
| 6,289,322 | B1 | 9/2001 | Kitchen et al. |
| 6,327,577 | B1 | 12/2001 | Garrison et al. |
| 6,334,116 | B1 | 12/2001 | Ganesan et al. |
| 6,966,326 | B2 * | 11/2005 | Murray et al. ................ 137/2 |
| 6,978,210 | B1 * | 12/2005 | Suter et al. ................... 702/13 |
| 7,162,444 | B1 * | 1/2007 | Machado et al. .............. 705/35 |
| 7,539,593 | B2 * | 5/2009 | Machacek .................... 702/127 |
| 7,555,454 | B2 * | 6/2009 | Cooper et al. ............. 705/36 R |
| 2004/0024684 | A1 * | 2/2004 | Montepeque ................. 705/37 |
| 2004/0024692 | A1 * | 2/2004 | Turbeville et al. ............. 705/38 |
| 2005/0182709 | A1 * | 8/2005 | Belcsak et al. ................ 705/38 |

OTHER PUBLICATIONS

Reservoir Engineering Handbook, 2001.*
The Effect of the United If the The Effect of the United States' gGranting Vietnam Most Favored Nation Status, Martin, W and Fukase, E, World Bank Policy Research Working Paper No. 2219, Nov. 1999.*

(Continued)

*Primary Examiner*—Charles R Kyle
*Assistant Examiner*—Linda Perry
(74) *Attorney, Agent, or Firm*—Fish & Richardson P.C.

(57) ABSTRACT

In one embodiment, a system can include a centralized storage module, for example a database, that stores data relating to petroleum, natural gas and other related products taken from several different sources and entities. The entity storing and maintaining this data can be an entity independent from the operators, producers and/or other working interests. This system can use automated techniques to reconcile distributions to all entities associated with a well due to the removal of a mineral, for example, petroleum, natural gas and/or other related products, from that well, on a periodic basis. These automated techniques include, for example, reconciling all agreements associated with the well, reconciling the amount of mineral removed at the well, reconciling the spot market price associated with the well at the time of removal, automating approval by the removing entity, automating payment and the like.

67 Claims, 5 Drawing Sheets

OTHER PUBLICATIONS

API Out of Print 1980.*

Coternancy and competition in an experimental auction market for natural gas pipeline networks, Rassenti Steven J., Reynolds Stanley S., Smith Vernon L, Economic Theory Mar. 2, 1992, Springer-Verlag (c) 1994.*

Anderson, Owen L., Royalty Valuation: should royalty obligations be determined intrinsically, theoretically, or realistically? Why all the fuss? What does History Reveal? Petroleum and Financial Management Journal, Summer 1998.*

Pages from Altranet.com,Apr. 5, 2001 May 15, 2001, Feb. 17, 2002, accessed from archive.org.*

Page from amerex.com, Jun. 19, 2001, accessed from archive.org.*

Energy Derivatives: Trading Emerging Markets, Fusaro, C.F., and Wilcox, J., 2000.*

PetroVantage.com/solutions.html, Mar. 30, 2001, accessed from archive.org.*

FERC: Federal Energy Regulation Commission,Instruction Manual for Electronic Filing of the Rate Filings, Jan. 1997.*

Altra1: Altra, Prebon Energy, And Amerex Release Online Power Trading Exchange ALliance, Oct. 28, 1999, electrnet.com.*

Price Waterhouse introduces integrated system of petroleum industry client-server business solutions, Business Wire, Jan. 11, 1995.*

An Optimization Based Integrated Short-Term Refined Petroleum Product Planning System, Klingman, D, Philips, N, Steiger, D, Wirth, R, Padman, R, Krishan, R, Management Science, vol. 33, No. 7 (Jul. 1987), pp. 813-830.*

Efficiency of Asset Valuation Rules under Price Movement and Measurement Errors, Lim, S and Sunder, S , The Accounting Review, vol. 66, No. 4 (Oct. 1991), pp. 669-693.*

Factory costs, market prices, and Indian calicos: cotton textile prices revisited, 1779-1831, Esteban, J., Economic History Review, LII, 4, 1999, pp. 749-755.*

*Feerer* v. *Amoco Production Co.*, US Court of Appeals, Tenth Circuit, Mar. 21, 2001.*

Altra Power 4.0, retrieved using archive.org.*

Creating Data Bases for Power Systems Planning Using High Order Linear Interpolation, Mukerji, R, Burke, W, Merrill, H, Lovell, B, IEEE Transactions on Power Systems, vol. 3, No. 4, Nov. 1988.*

Petrovantage COE-R and TradersEdge , accessed using archive.org.*

* cited by examiner

ELECTRONIC SETTLEMENT OF PETROLEUM AND GAS DISTRIBUTIONS

CLAIM OF PRIORITY

This application claims priority under 35 USC § 119(e) to U.S. Patent Application Ser. No. 60/389,822, filed on Jun. 19, 2002, the entire contents of which are hereby incorporated by reference.

TECHNICAL FIELD

The invention relates to electronic settlement, and more particularly electronic settlement of petroleum and gas distributions.

BACKGROUND

The removal of a mineral such as oil or natural gas from a well involves settlement among multiple ownership interests (e.g. the producer, royalty owners, joint venturers). Determination of settlements for any of the multiple owners that are owed portions of the extracted minerals may involve determining prices and quantities associated with a mineral flow. In the past, distribution of the mineral was generally controlled by one large entity. This entity had knowledge of the mineral flow, including prices and quantities and thus could readily determine settlements for any of the multiple owners that were owed portions of the extracted minerals. Since the advent of deregulation, the distribution chain of the mineral has been broken up and controlled by several different entities, resulting in different entities having their own controls and procedures. In addition, different ownership interests and distribution entities may have different price realization points. This has led to the multiple owners receiving inconsistent settlement payments from the different entities.

SUMMARY

This description includes methods and systems to centralize data from multiple sources and automate the process of settlement determination and distribution to arrive at consistent settlement distributions. In general, in one aspect there is a method for determining a price associated with a well. The method includes receiving global price data, receiving local cost data, determining a correspondence between the global price data and the well, and determining a local price associated with the well using the global price data, the local cost data and the determined correspondence. Other examples can include one or more of the following features. The global price data can include price data from market centers. The correspondence can include a statistical pattern of flow of a mineral from the well to each of the market centers. The local cost data can include respective transportation costs from the well to each of the market centers. The global price data can include a published price from a New York mercantile exchange, an index price, or an actual sell price from an independent entity. The local cost data can include gathering costs, transportation costs, values of shrinkage or prevailing transportation and gathering routes. Determining a local price can be performed automatically on a periodic basis.

The method can include determining a monetary value using a technique comprising a fair market value technique, a gross proceeds technique, a highest price in an area technique, a most favored nation technique, a major portions technique or a technique compliant to a government regulation or a contract term. The method can include selecting monitoring points providing the global data, each monitoring point providing a respective price per quantity of the mineral and at least one monitoring point corresponding to an independent entity. In some examples, no single entity controls the global price data. The method can include generating an estimated probability density function associated with the local price.

In general, in another aspect, there is a method for automatically determining settlement rights and obligations associated with a well. The method includes storing data associated with a set of documents, the data comprising summaries of rights and obligations associated with the set of documents and geospatial data associated with the set of documents, and automatically determining settlement rights and obligations associated with a well based on the summaries of rights and obligations and at least a partial intersection of the geospatial data with a geospatial description of the well.

Other examples can include one or more of the following features. The method can include automatically determining settlement rights and obligations is performed periodically. The method can include automatically determining whether a conflict exists between any of the summaries of rights and obligations and, if a conflict is determined to exist, automatically resolving the conflict based on a heuristic process. Automatically determining whether a conflict exists can be performed on a periodic basis. The method can include generating an alert upon the occurrence of a predefined event. A document in the set of documents can include a contract, a lease, a will, or an agreement.

In general, in another aspect, there is a method for settling a distribution to entities due to the removal of a mineral from its origin by an operator. The method includes automatically determining a respective quantity of mineral to be distributed to each of the entities, receiving from one or more of the entities over a computer network an election to sell their respective portion, and aggregating each of the respective portions of the one or more of the entities thereby generating a collective portion of the mineral. Other examples can include one or more of the following features. The mineral can include petroleum, natural gas or other related products. The other related products can include natural gas liquids, $CO_2$, helium, sulfur, or coal bed methane. The method can include selling the collective portion of the mineral through an independent marketing program. The method can include determining the respective monetary value for each respective portion based at least in part on a sell price of the collective portion.

In general, in another aspect, there is a method for automatically reconciling volume data to ascertain a quantity of mineral associated with a well. The method includes receiving volume data from sources, balancing the respective volume data from a first source with the other volume data from the other sources, and automatically determining a quantity of mineral based at least in part on the balanced volume data. The method can also include using a liquid, gas and solid balancing technique or a mass and heating balancing technique.

In general, in another aspect, there is a method for settling a distribution to a first entity due to the removal of a mineral from its origin by a second entity. The method includes transmitting to the second entity a message associated with a settlement, displaying to the second entity a monetary value to be distributed to the first entity due to the removal of the mineral, and allowing the second entity to approve the monetary value over a computer network. Other examples can include one or more of the following features. The mineral can include petroleum, natural gas or other related products.

The other related products can include natural gas liquids, CO2, helium, sulfur, or coal bed methane. The method can include providing a centralized call center. The method can include displaying a settlement statement providing one or more links to supporting data. The supporting data can include a schematic diagram, a map, an electronic representation of a document, a price graph or a volume graph. The method can include, if the second entity approves the displayed settlement statement without changes, indemnifying the second entity against any liability to the first entity. The method can include, if the second entity approves the displayed settlement statement without changes, electronically transferring the monetary value to an account associated with the first entity.

In general, in another aspect, there is a method for generating settlements. The method includes storing in a storage module quantity data associated with a mineral, storing in the storage module price data associated with the mineral from sources including an independent source, storing in the storage module data associated with rights and obligations, reconciling by the storage module any inconsistencies of the quantity data, price data or data associated with rights and obligations, and generating by the storage module a settlement using the quantity data, price data and data associated with rights and obligations. The mineral can include petroleum, natural gas or other related products. The other related products include natural gas liquids, CO2, helium, sulfur, or coal bed methane.

In general, in another aspect, there is a method for settling a distribution to a first entity due to the removal of a mineral from its origin by a second entity. The method includes automatically determining a monetary value associated with a portion of the removed mineral to be distributed to the first entity from the second entity using stored quantity data, stored price data and stored data associated with rights and obligations, and upon approval by the second entity of the monetary value to be distributed to the first entity, electronically transferring the portion of the monetary value to an account associated with the first entity. Other examples can include one or more of the following features. The mineral can include petroleum, natural gas or other related products. The other related products can include natural gas liquids, CO2, helium, sulfur, or coal bed methane.

The method can include receiving a quantity value corresponding to an amount of the mineral removed from its origin by the second entity over a predetermined time interval, and determining a portion of the quantity value to be distributed to the first entity. The method can include determining measuring points, each measuring point providing data to calculate a respective quantity of the mineral over the predetermined time interval, and determining an amount of the mineral removed from its origin by the second entity over the predetermined time interval using each respective quantity. The method can include comparing each respective quantity with each other respective quantity, and reconciling any differences to arrive at a calculated quantity that is accurate to statistical degree of certainty. The can include calculating the respective quantity by determining a portion of a total quantity of the mineral at the measuring point that is caused by the second entity removing the mineral from its origin.

The method can include determining a monetary value using a technique comprising a fair market value technique, a gross proceeds technique, a highest price in an area technique, a most favored nation technique, a major portions technique or a technique compliant to a government regulation or a contract term. The method can include determining monitoring points, each monitoring point providing a respective price per quantity of the mineral and at least one monitoring point corresponding to a third entity, wherein determining a monetary value further comprises determining a monetary value associated with a portion of the removed mineral using the respective prices per quantity. The method can include selecting a quantity of monitoring points such that no single entity controls the determined monetary value. The method monitoring points can include a published price from a New York mercantile exchange, an index price or an actual sell price from the third entity.

The method can include receiving data including one or more parameters defining a relationship between the first and second entities, wherein the stored data associated with rights and obligations comprises the one or more parameters. One or more parameters can be associated with at least one of a royalty rate, a lease term, a farm-out term, a tax regulation. The method can include displaying a settlement statement to the second entity including the monetary value to be distributed to the first entity. The method can include displaying an amount of the mineral removed, providing a hyperlink to the quantity data used in determining the amount of the mineral removed, and displaying the determined monetary value to be distributed to the first entity. The method can include providing a hyperlink to the price data used in determining the monetary value to be distributed to the first entity; and providing a graphical user interface that allows the second entity to accept or change each of the displayed items.

The method can include, if the second entity accepts all of the displayed items without changes, indemnifying the second entity against any liability to the first entity. The method can include establishing the account on behalf of the first entity. Automatically determining a monetary value can be performed independently of the first entity and the second entity.

In general, in another aspect, there is a system for settling a distribution to a first entity due to the removal of a mineral from a well that includes a valuation module. The valuation module can be configured to receive settlement rights and obligations associated with the well, to receive quantity data associated with a portion of the removed mineral, to receive price data associated with the mineral, and to determine a monetary value associated with the portion of the removed mineral, based on the quantity data and the price data. Other examples can include one or more of the following features. The mineral can include petroleum, natural gas or other related products. The other related products can include natural gas liquids, CO2, helium, sulfur, or coal bed methane.

The system can include a document management module configured to provide to the valuation module the settlement rights and obligations associated with the well, based on geospatial data associated with the settlement rights and obligations and at least a partial intersection of the geospatial data with a geospatial description of the well. The system can include a volume capture and confirmation module configured to provide to the valuation module the quantity data associated with a portion of the removed mineral, based on determining an amount of the mineral removed from the well over a predetermined time interval. The system can include a market monitoring module configured to provide to the valuation module the price data associated with the mineral, wherein at least one source of the price data is an entity independent of any party or entity having the settlement rights and obligations. The system can include a billing and transaction clearing module configured to transfer a portion of the monetary value associated with the portion of the removed mineral to an account associated with the first entity, based on the settlement rights and obligations. The party or entity having the settlement rights and obligations can be enabled to view the monetary value associated with the portion of the removed mineral via a network.

In general, in another aspect, there is an article of manufacture having computer-readable program portions embodied therein, the article comprising instructions for causing a processor to perform each of the parts of one or more of the above-described methods.

Other features and advantages of the invention will be apparent from the description of the preferred embodiments thereof and from the claims.

DETAILED DESCRIPTION

Figure 1:
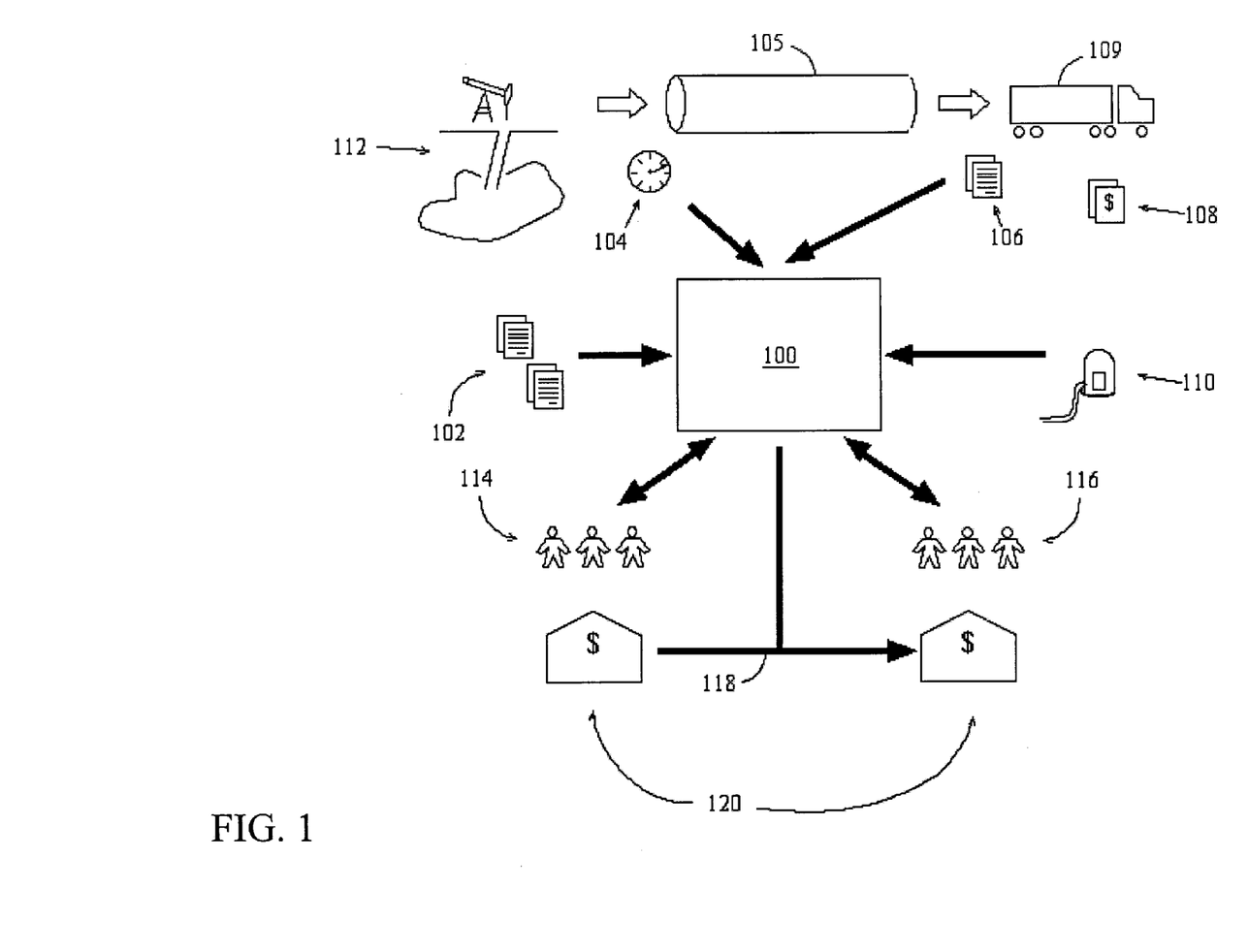
FIG. 1 is a diagram showing an electronic settlement system and its relationship to various data, documents, and parties.

FIG. 1 is a diagram showing an electronic settlement system 100 and its relationship to various data, documents, and parties involved in the settlement process. The settlement system 100 is summarized here and described in more detail below. In general settlement system 100 captures, stores, and maintains documents and data from various sources for use in determination of settlements. A settlement typically includes what parties owe what other parties royalties or other payments, in cash or in kind, for the extraction of oil, natural gas, and related products (generally referred to herein as minerals) from a well 112.

System 100 receives documents 102, such as leases, contracts, and agreements that govern the ownership in, and the rights and obligations to the mineral extracted from well 112. System 100 stores the documents 102 and/or data from the documents 102 and automatically determines those documents that are associated with well 112. Using the documents associated with well 112, system 100 can determine precise rights and obligations of the parties associated with the well to determine an accurate settlement. When they exist, system 100 also identifies and automatically resolves conflicts between two or more documents to arrive at an accurate settlement.

System 100 also captures data reflecting the volume of minerals extracted, using various measuring points. For example, system 100 stores a reading from a meter 104, which measures the mineral leaving well 112 and flowing into a facility 105 to prepare for transporting. In another illustrated example, system 100 also captures data reflecting the volume of minerals that are transported, by using a quantity listed in a document 106, for example an invoice or sales receipt prepared by facility 105 or a transporter 109. System 100 can also capture volume data from the recipient (not shown) of transporter 109. The recipient has his own measurement for the volume of mineral for which he takes custody. The data from the recipient may also be from an invoice or sales receipt, or the data may be from a meter attached directly to the inlet pipe of the recipient's storage tank. With volume data coming from these various measuring points controlled by different entities, it can be seen that the volumes can differ. To prepare an accurate settlement, system 100 automatically reconciles the volume data periodically.

System 100 also monitors price data using various monitoring points controlled by different entities. The price data includes prices at which minerals are sold and costs related to the gathering, processing, storage, transportation, and sale of the mineral at many different geographical locations. The monitoring points and/or data can be in several different forms. For example, the price data can come from a transportation billing document 108 associated with the transporter 109. Billing document 108 reflects costs associated with transporting minerals from facility 105 to a particular recipient and/or market center. In another illustrated example, the pricing data also comes from a ticker 110, which represents a real-time feed of market price data associated with the mineral from a particular market (e.g., New York Mercantile Exchange) in which the mineral is traded. System 100 analyzes and uses this price data to determine an estimated value for the mineral extracted from well 112, to determine an accurate settlement. The provisions in documents 102 that govern well 112 can also influence and/or dictate the type of valuation system 100 uses to determine the estimated market value for the mineral extracted from well 112.

As described above, system 100 uses the received and/or stored data to determine accurate settlements. System 100 periodically calculates and presents settlements for each ownership interest. System 100 presents bills to "due from" parties 114 and detailed financial statements to "due to" parties 116 based on settlement amounts. Parties 114 and 116 may use an electronic network (not shown) to access system 100 with a computing device to review settlement, information including financial agreements and facility data, as well as to request changes and/or approve amounts. Party 116 can also elect a future share of minerals for sale through an independent marketing program. The parties may also use a centralized call center (not shown) for personalized assistance. If party 114 approves the settlement, system 100 transfers funds over an electronic network 118 between financial accounts associated with the "due from" parties 114 and "due to" parties 116 (e.g. using commercial banking institutions 120).

Figure 2:
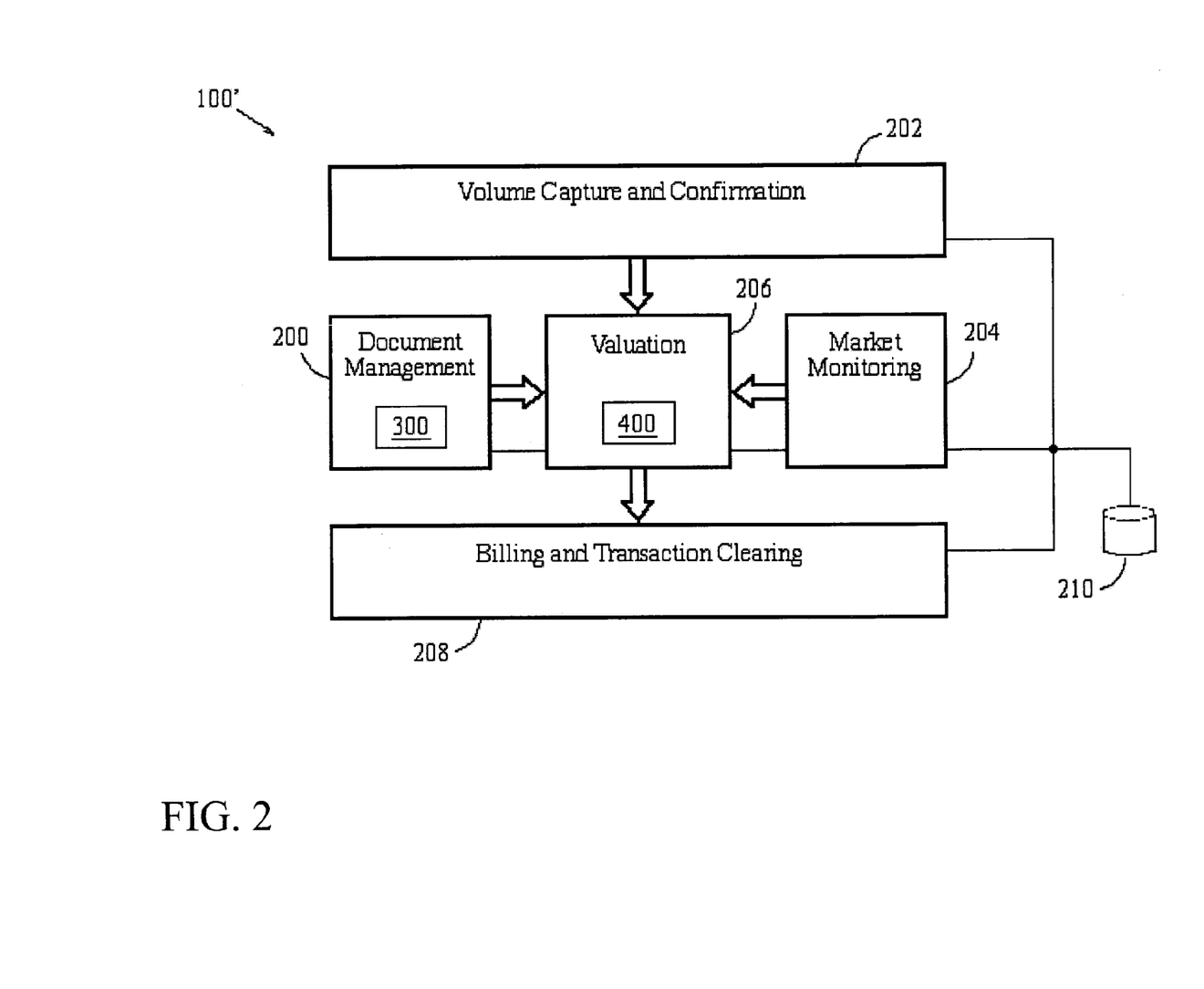
FIG. 2 is a block diagram showing modules of an electronic settlement system.
Figure 3:
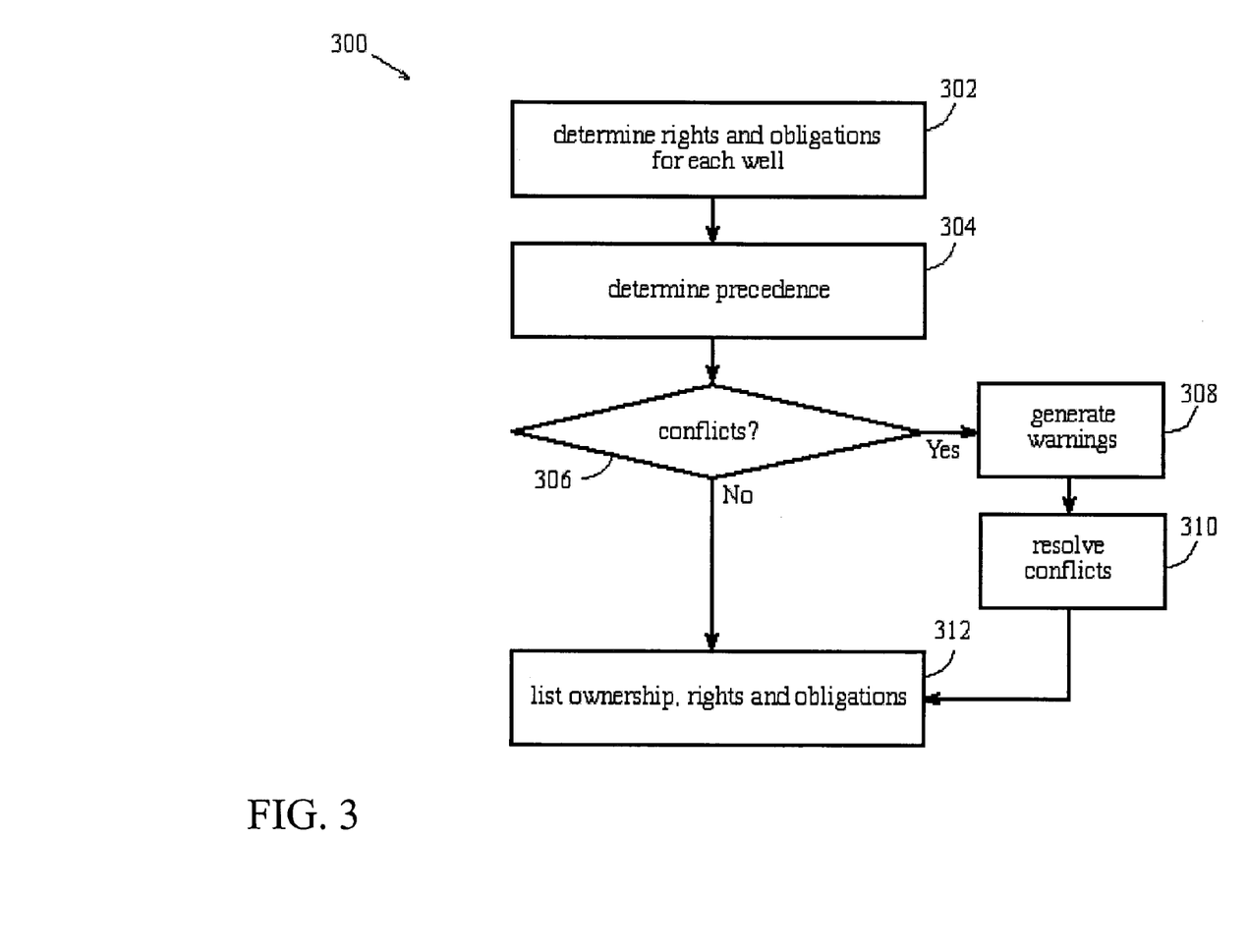
FIG. 3 is a flowchart of a process performed by a document management module.
Figure 4:
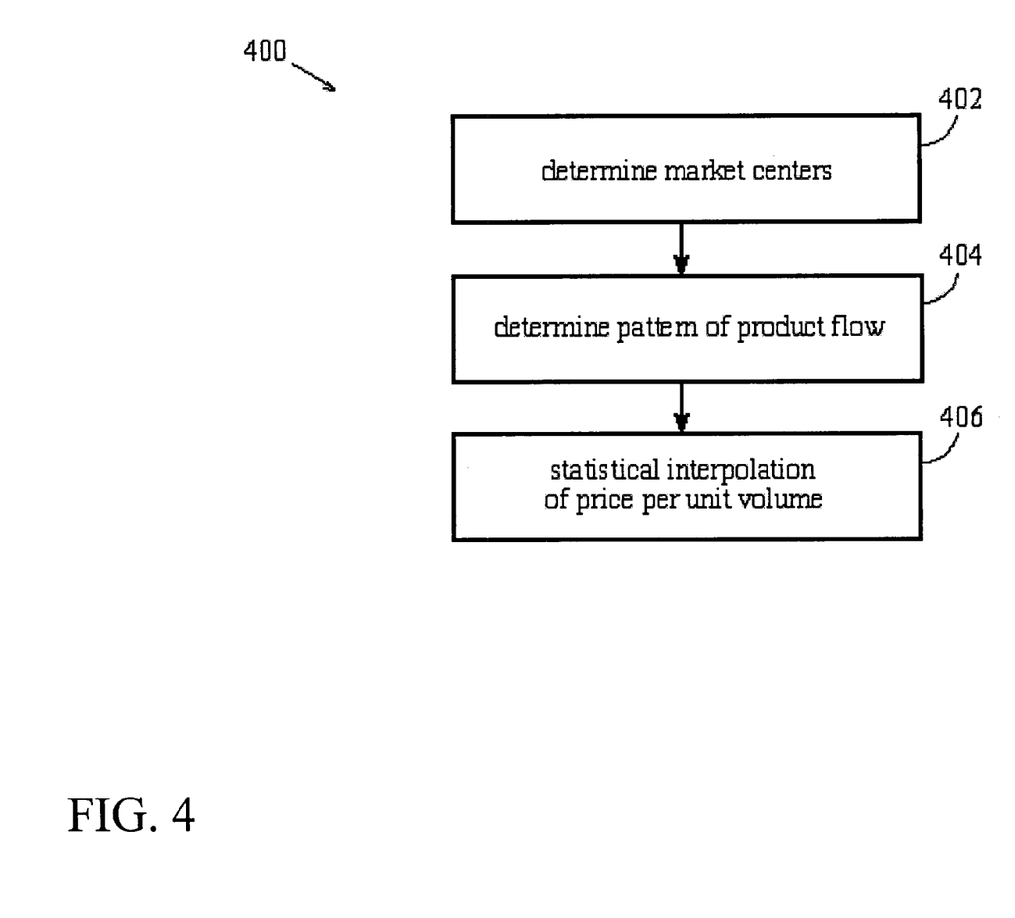
FIG. 4 is a flowchart of a process performed by a valuation module.

FIG. 2 shows a block diagram of an embodiment of electronic settlement system 100' in more detail. System 100' includes a document management module 200, a volume capture and confirmation module 202, a market monitoring module 204, a valuation module 206, a billing and transaction clearing module 208, and a storage module 210. As illustrated, module 200 employs process 300 and module 206 employs process 400, both described in more detail below.

Document management module 200 collects information from source documents and related information regarding leases, deeds, contracts and all other agreements that govern the ownership of, and the rights and obligations associated with a well, for example well 112 (FIG. 1) and the minerals extracted from that well. The source documents and related information may refer to several different parties, and may contain or refer to geospatial data associated with one or more wells. The geospatial data can be described using various techniques, such as metes & bounds or polygons.

Instead of relying on a single document (such as a division order) to determine the rights and responsibilities of various parties associated with a well, module 200 gathers many types of source documents from various sources. The use of many types of source documents increases the accuracy of the settlement process. For example, the source documents and related information can include lease agreements, deeds, recordations, probates, joint operating agreements, farmout agreements, division orders, assignments, conveyances, gas balancing agreements, pooling agreements, unitization and communitization agreements, state and federal regulations and regulatory filings, sales contracts, drilling reports, well completion reports, pipeline tie-in reports, maps, field plats, latitudes, longitudes, map polygons, depths, formations, meter proving reports, field schematics, gathering system schematics, gathering agreements, processing agreements, storage agreements, and/or transportation agreements.

Module 200 stores information summarizing rights and responsibilities contained in each of the documents. Such information can include, for example, the involved parties such as owners and operators along with names, addresses, and other identifiers for the involved parties. The information can also include contractual terms, such as royalty rates, the cost and profit distributions among parties, the party responsible for making payments, the frequency of settlement, any required valuation techniques, and the like. The information can also include associated geospatial data used to identify a well or wells. Module 200 acquires this information from the documents using both manual and electronic methods, such as keypunching and optical character recognition, and stores the information in the storage module 210. In addition to this information, module 200 electronically stores a full copy of each of the documents. Storage module 210 can be, for example, a central, integrated database, capable of linking data by means of identifiers and geospatial data. The stored information can be in a form (e.g. ASCII text) in which it can be searched and manipulated automatically by a computer program. Module 200 can also use a land information system (not shown) to manage the captured data. One such land information system is Tobin LandSuite™, manufactured by Tobin International, Ltd of Abilene, Tex., which can integrate textual and spatial land and ownership data with other related data such as oil/gas exploration and production information.

Module 200 automatically reconciles the source documents and related information periodically, for example, each month, using automated system business rules, identifiers, and cross-references, and geospatial data. The objective of this reconciliation includes determining the correct ownership of the extracted minerals, and determining the rights and obligations of all parties involved in the extraction, consumption, gathering, processing, storage, transportation, pricing, selling, invoicing, paying and accounting for the extracted minerals. Module 200 analyzes the information in the storage module 210 to produce a list of all parties, with a description of their ownership interest in the minerals from each well, if any, and their associated rights and obligations.

FIG. 3 shows a flowchart for an exemplary process 300 that module 200 uses to make such an analysis. Process 300 determines 302 the rights and obligations associated with each well. To make this determination, process 300 cross-references geospatial data associated with the source documents with geospatial descriptions of each well to determine a total or partial intersection. Module 200 can store the geospatial data associated with the documents and the geospatial description of each well, for example, as database entries in storage module 210, so that process 300 can make an automated comparison. The geospatial data associated with the documents and the geospatial description of each well can be in different formats. For example, the geospatial data associated with the documents can be represented by a polygon, while the geospatial description of a well can be represented by longitude and latitude coordinates. Process 300 can determine the intersection on both a 2-dimensional and a 3-dimensional basis, to resolve both aerial and subsurface rights and obligations. Based on the total or partial intersection, process 300 produces a list of rights and obligations of various parties associated with that well.

Process 300 determines 304, which rights and obligations take precedence over others, using business rules and heuristics that are based on state, federal, and Indian government regulations, court rulings, prevailing case law, and most predominant industry practice in a given geographic area. For example, typewritten or handwritten provisions control over printed form provisions. Explicit or implicit terms of any given agreement may indicate which rights and obligations supersede others. In some cases there may be conflicts among different agreements. Process 300 determines 306 whether there are any rights and obligations that are ambiguous or in conflict with each other. If so, process 300 generates 308 warnings or alerts indicating the conflicts, then automatically resolves 310 the conflicts based on a heuristic process. For example, an automated conflict resolution rule can be that agreements with later dates supersede agreements with earlier dates. Other conflict resolution rules can be based on current legal precedent for the applicable jurisdiction. If necessary, process 300 prompts an administrator for further information to reconcile conflicting rights and obligations. Process 300 also generates automatic warnings and alerts to indicate the absence of data, pending expiration of agreements, or inconsistencies across source documents and related information. Process 300 then generates 312 a list of parties, with a description of their ownership interest in the minerals extracted from each well, if any, and their associated rights and obligations. This list is also stored in the storage module 210.

Referring back to FIG. 2, volume capture and confirmation module 202 collects and stores data describing the periodic (e.g. monthly) extraction of oil, natural gas, and related products such as liquid or gas volumes. As described above, sources of this data can vary and include, for example, meter readings, operator and transporter statements (e.g., invoices, bills, sales receipts). Module 202 can use various kinds of telemetry to obtain measurements, such as wired or wireless communication with different meters. Module 202 can also use methods of acquiring the data from documentation similar to the manual and electronic methods used by document management module 200, described above.

Module 202 reconciles this volume data periodically using an automated system of business rules, identifiers, and cross-references, engineering formulas, and balancing formulas. For example, module 202 can use the volume of the mineral extracted from the well as long as no other measurements vary from the well measurement by more than an acceptable tolerance, such as 2%. Other automatic resolution rules include, for example, taking a weighted average of conflicting volume amounts where the weights are estimated confidence levels or using some of the balancing techniques described below.

Objectives of this reconciliation include determining accurate estimates of the actual volumes of oil, natural gas, and related products extracted, processed, stored, transported, and sold in a given period (e.g. one month). More accurate estimates are obtained by comparing multiple sources of data with one another and resolving discrepancies between the sources if discrepancies exist. Module 202 adjusts each value prior to comparison using standard engineering formulas and conversion factors to establish a common basis for comparison. For example, for natural gas, all data may be converted to units of 1000 cubic feet ("MCFs"). Module 202 also corrects for temperature, pressure, and other operating conditions before comparison.

Module 202 uses one or more balancing methods for the purpose of determining measurement errors, allocation errors, omissions, or inconsistencies. One type of balancing method is liquid, gas, and solid volume balancing. Another type of balancing method is mass and heating content balancing. Liquid, gas, and solid volume balancing compares multiple sources of volumes, measured in barrels, gallons, or other customary units. Mass and heating content balancing compares multiple sources of mass and heating content, measured in customary units of measure for mass, chemical composition, and heating content. For either method, the comparison may be done individually or in aggregate, depending on the delivery system and the nature of each measurement. For example, module 202 can determine volumes using observed pressure and temperature data, using observed and gauged liquid levels and temperature and combining these with certified tank strapping data, and/or using certified lab tests of gas composition and water to determine heating content (e.g., MMBTU).

The results of reconciliation using these balancing methods include a list of producing wells, along with the actual volumes, measured and/or calculated, of oil, natural gas, and related products extracted and sold for each well in a given period. Module 202 stores the collected data and these results in the storage module 210. There are also a series of automatic warnings and alerts indicating the absence of data, conflicting or inconsistent volumes, and other inconsistencies and imbalances.

Market monitoring module 204 collects and stores prices, fees, costs and other market price data related to the gathering, processing, storage, transportation and sale of oil, natural gas and related products such as spot prices, index prices, and include allowances for shrinkage and loss. This data can be captured and recorded on a daily basis from public and private sources, such as a real-time feed of data from exchanges (e.g., New York Mercantile Exchange), actual sales prices, regulatory filings, published data and private contracts. For each of the minerals extracted from a well, it is advantageous for at least one of the sources of price per unit volume to be from an independent source. That is, the independent entity has no relationship to the ownership interests or parties with rights and responsibilities associated with the well. Similarly, it is advantageous for no single entity to control the price data. When module 204 receives price data from various market centers, module 204 also records and/or determines transportation charges with respect to transportation routes from the vicinity of each well to various market centers, which, as described below, can be used in an estimated market valuation at the well. Module 204 stores collected data in storage module 210 in a format such as an integrated database to support statistical analysis.

Valuation module 206 determines an estimated market value associated with each well. Periodically (e.g. monthly) module 206 analyzes the data collected by the other modules (e.g., the market monitoring module 204 and from volume capture and confirmation module 202) to determine, with reasonable confidence, local prices at each well for the extracted minerals. The estimated market value of products from a well are functions of prices for which the mineral is sold, as well as associated fees, costs, and other charges, taking into account compliance with all regulations and the associated rights and obligations as determined in process 300.

FIG. 4 illustrates a flowchart of a process 400 to compute the estimated market value for the minerals extracted at each well. Process 400 determines 402 the prevailing market centers serving each well, and determines 404 the general pattern of product flow to each market center over the transportation routes from the vicinity of each well to each market center. In order to find an estimated market value at the well, process 400 uses, local cost data (e.g., transportation costs from the vicinity of the well to market centers), global price data (e.g. an index price associated with the market centers), and the determined pattern of product flow (e.g., which percentage of minerals travel to which market centers). If necessary, process 400 performs a statistical interpolation 406 of such local cost data and global price data resulting in an estimated market value for each producing well, per unit volume of production, based on the determined pattern of flow. The statistical interpolation accounts for the variability in the data, which can be characterized by minimum, maximum, average, and standard deviation statistics along with the sampling error and observation error for each data item. An estimated probability density function may be used in the statistical interpolation. The estimated market value is sufficiently detailed to include taxes, royalties and settlement values for a wide variety of lease and agreement provisions, including: highest price in the area, most favored nations clauses, major portions pricing, best commercially available price, and fair market value at the wellhead.

Referring back to FIG. 2, billing and transaction clearing module 208 calculates monthly settlements, using information from storage module 210 including: ownership information from document management module 200, volume estimates from volume capture and confirmation module 202, estimated market values from the valuation module 206, and the rights and obligations of each party from the document management module 200. Settlement, due to minerals extracted from a well, can result in monetary transactions between parties, where an amount is owed from a "due from" party to a "due to" party. For example, the amount owed could be based on a royalty rate, a lease term, a farm-out term, or a tax regulation. The result of the settlement calculations performed by module 208 is a list of settlements, where each settlement contains for example, the quantities of the mineral (s) to be settled, the values of the mineral(s), including costs, fees, taxes and other charges, and the parties involved in the settlement, including the "due to" and "due from" parties.

Module 208 prepares a detailed bill for each "due from" party and makes it available, for example, as a secure web page. An email message is sent to a "due from" party notifying them of pending settlements and corresponding due dates. The email includes a hyperlink to the secure web page that contain the detailed bill. The "due from" party is enabled to access and inspect the bill and indicate (e.g. using a graphical user interface), for each settlement, whether to approve as-is, approve with changes made using the secure web page, hold for further analysis, or hold and generate minimum, shut-in, estimated, or other type of payment for the purpose of maintaining the lease. If a settlement is approved without changes the "due from" party can be indemnified against any liability to the "due to" party.

Module 208 prepares a detailed statement for each "due to" party, which is also made available as a secure web page. Paper-based statements can be prepared for those parties who request them. An email message is sent to each "due to" party, notifying them of settlements that have been processed. The email includes a hyperlink to the secure web page that contain the detailed statements. The "due to" party is enabled to access their detailed statement describing each individual settlement item. Module 208 also prepares federal and state regulatory filings for each settlement, including for example, government royalty reports, severance tax reports, non-resident alien withholding reports, and annual 1099's for any party receiving over the trigger amount for the year.

Module 208 also provides both "due from" and "due to" parties with additional services such as online "drill-down." For online, "drill-down", each electronic bill and electronic statement includes secure hyperlinks that allow each party to "drill down" and review the details that comprise each settlement. Each "drill down" represents additional, secure web pages that include various data. Some pages include data associated with wells such as: scanned images of leases and other agreements, schematic diagrams of wells, equipment, and measurement points, diagrams depicting general product flow, maps depicting well sites, horizontal well courses, pipeline courses, reservoir boundaries, subsurface depth indications, and polygons representing the acreage stipulated by each lease or other agreement. Some pages include graphs and charts depicting historical trends of prices, volumes, and any factor used in calculating settlements such as histograms and other statistical charts illustrating the determination of estimated market values. Web pages also provide text-based reports listing selected components of any settlement calculation.

Customer service is available by both online support and by a centralized call center. The online support makes information available such as answers to frequently asked questions regarding settlement calculations and display analyst comments and remarks. Online submission of questions is also made available to enable follow-up via email. A centralized call center with toll-free telephone access is available, during extended business hours, to provide immediate and personalized assistance to any party involved in settlements.

Another feature provided by billing and transaction clearing module 208 allows owner marketing elections to be made via the Internet, allowing royalty and other interest owners to dedicate their share of minerals to independent marketing programs. Using ownership and rights and obligations information from document management module 200 and future market values computed in valuation module 206, module 208 provides each royalty and other interest owner with their marketing rights and obligations with respect to their share of minerals. These marketing rights and obligations include the share that is available for dedication, an estimate of production volumes in future months, an estimate of future market values of these volumes, and a choice of one or several independent marketing programs through which that owner may independently sell its share of production.

Module 208 provides a secure web page that allows each owner to make an election to dedicate their share of minerals for a specified future period of time to an independent marketing program of their choosing. The volumes and values for future minerals are based on estimates at the time of the marketing election. Then for each actual sale made under an independent marketing program, the actual volumes and values comprising each sale are determined, and settlements are automatically generated between the owners and the corresponding buyers of their products. The ownership shares of minerals for several parties can also be aggregated to generate a collective share that can then be sold through an independent marketing program. The monetary compensation to each party is then based on the sale price of the collective share.

Figure 5:
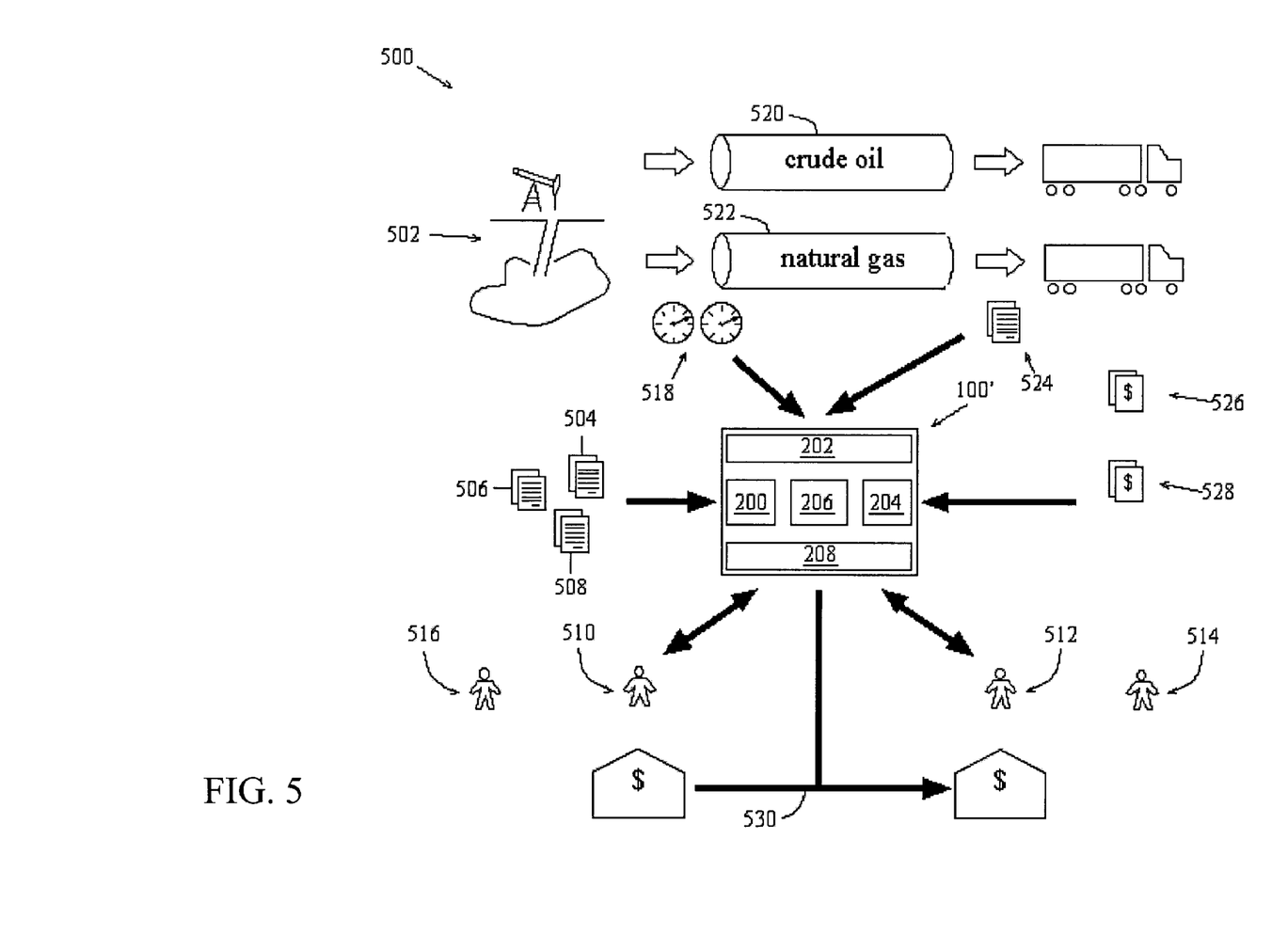
FIG. 5 is a diagram showing an example of an electronic settlement system being used to determine settlements from a company to a royalty owner.

To aid in describing the modules of system 100', FIG. 5 illustrates a specific example 500 of system 100' in operation. In example 500, module 200 collects three agreements with respect to a well 502. One agreement is a lease agreement 504 associated with well 502 between a company 514, who is the lessee, and an individual landowner 512, who is the lessor. The agreement states that landowner 512 is to receive a 20% royalty, valued at the highest price in the area. Another agreement is a conveyance 506 that assigns the lease to company 510, transferring the obligation for royalty payments from company 514 to company 510. Another agreement is a joint operating agreement 508 between company 510 and company 516 to split all revenues and costs (including royalty payments to owner 512) associated with well 502 by 50%.

The list of parties with ownership interest would include company 510, company 516, and landowner 512. The rights and obligations are the following. Company 510 and company 516 share equal portions of revenues due to sale of crude oil (sold to company A) and natural gas (sold to company B), and they also share equal obligation to pay royalties to landowner 512 from the oil and natural gas produced by well 502. Landowner 512 has a right to 20% of the value of the minerals (i.e., oil and gas) at the highest price in the area.

For the first month, company 510 and company 516, as operators of well 502, report the extracted volumes as 100 barrels of crude oil and 200 MCF of natural gas from readings taken at meters 518 that measure the flow of minerals from well 502 to processing facilities 520 and 522. The purchasers of the minerals also report volumes, using transportation statements 524. Operators 510 and 516 send the crude oil through facility 520, which is associated with company A, and the natural gas through facility 522, which is associated with company B. Company A reports the volume of crude oil received as 101 barrels. Company B reports the volume of natural gas received as 200 MCF. Module 202 determines that 200 MCF of natural gas is produced by well 502 in the first month because both sources report the same volume and there is no discrepancy. There is, however, a discrepancy in the amount of crude oil reported. In this case, module 202 resolves this discrepancy by taking the amount reported by the operators, 100 barrels of crude oil, as correct by default, since it agrees with the amount reported by company A to within a predefined tolerance (e.g. 2%).

Module 204 stores prices for crude oil and natural gas for the first month. For the crude oil, one source associated with the area of the well has a price of $20/barrel, and another source also associated with the area of the well has a price of $25/barrel. For natural gas, module 204 records only one source with a price of $3/MCF. The source providing this price is associated with a market center C (not shown) that is remote from the area of the well (e.g. 100 miles away) and is independent from parties 510, 512, 514, and 516. Module 204 also stores transportation prices based on transportation contracts with company A and company B. Company A has a contract 526 to transport crude oil at $2/barrel to market center C, and company B has a contract 528 to transport natural gas at $0.5/MCF to the market center C.

Module 206 determines the values for crude oil and natural gas for the first month using the calculations that follow. For crude oil, since the lease provision indicates that the highest price in the area is to be used, module 206 uses a value of $25/barrel, since both prices are associated with the area and $25/barrel is the highest. For natural gas, since there is no local price, the value is determined based on the price ($3/MCF) at the market center C taking into account transportation costs ($0.5/MCF) from the vicinity of the well to the market center C. The resulting estimated market value for natural gas at the well is $2.5/MCF (i.e., $3/MCF-$0.5/MCF). If neither or only one oil price was associated with the area of the well, module 206 can use a similar calculation (e.g., market price minus transportation costs) to determine an oil price associated with the area of the well.

Module 208 calculates a settlement between company 510 and landowner 512 for the first month due to products extracted from well 502 as follows. The volume of crude oil to be settled is 100 barrels. The volume of natural gas to be settled is 200 MCF. The value of the crude oil is $2500 (i.e., 100 barrels×$25/barrel). The value of the natural gas is $500 (i.e., 200 MCF×$2.50/MCF). The royalty payment that company 510 owes to landowner 512 is based on 50% of the value of the products (company 516 owes the other 50%) at a 20% royalty rate. This results in payments due from company 510 to landowner 512 of $250 (i.e., $2500×50%×20%) for the crude oil and $50 (i.e., $500×50%×20%) for the natural gas.

Upon approval, module 208 transfers funds via an electronic network 530 from the "due from" party's designated bank account into the "due to" party's designated bank account. A commercial banking institution can be used to execute these transfers. In example 500, module 208 transfers over network 530 a total amount of $300 (i.e., $250+$50) from company 510 to landowner 512 for the crude oil and natural gas products removed from well 502 in the first month.

A number of embodiments of the invention have been described herein. Nevertheless, it will be understood that various modifications may be made without departing from the spirit and scope of the invention. Some alternatives follow that illustrate, but in no way limit, some possible alternatives to the examples described above. For example: for manual and electronic methods for acquiring data: scanning, photocopying, faxing, map identification and plotting, electronic data interchange, transcription, and internet data capture and the like can by used; for geospatial data or a geospatial description of a well: state, county, section, township, range, meridian, polylines, latitude, longitude, depth coordinates, depth ranges, perforation intervals, formation descriptions and the like can be used; involved parties include: gatherers, processors, transporters, purchasers, trustees, agents, traders, customers, and the like; sources of data describing the periodic extraction of oil, natural gas and related products include: run tickets, tank gauge reports, well allocation reports, gathering statements, shipper statements, storage statements, processing statements, imbalance statements, well status and downtime reports, equipment specifications, laboratory reports, well tests, and the like; prices, fees, costs and other market data related to the gathering, processing, storage, transportation and sale of oil, natural gas and related products include: futures prices, option prices, contract prices, indices, posted prices, regulated prices, FERC tariffs, gathering charges, marketing fees, processing fees, storage fees, transportation charges, exchange differentials, gravity and quality differentials, and the like; data collected from the above sources include: dates and times, opening and closing tank levels, pressures, temperatures, liquid gravity or density, hydrocarbon mole percents, gas heating content, water content, sulfur content, CO2 content, helium content, and operating characteristics of equipment, and the like. Although the term electronic network is used above, any communications network can be used. For example, the network can include electrical, optical, wired, wireless, LAN, WAN, intranet, Internet, telephone, and cable communication channels.

What is claimed is:

1. A method for automatically reconciling volume data to ascertain a quantity of mineral associated with a well, the method comprising:
   receiving, from a provider of a mineral in a mineral sale, a first volume measurement of the mineral exchanged in the mineral sale;
   receiving, from a recipient of the mineral in the mineral sale, a second volume measurement of the mineral exchanged in the mineral sale, the second volume measurement being different than the first volume measurement;
   accessing, using an electronic settlement system, an automatic resolution rule defined to reconcile differences in volume measurements received from the provider and volume measurements received from the recipient in the mineral sale;
   based on the automatic resolution rule, automatically determining, using the electronic settlement system, a third volume measurement of the mineral exchanged in the mineral sale, the third volume measurement being different than at least one of the first and second volume measurements;
   determining, using the electronic settlement system, an estimated market value for minerals extracted from a well from which the mineral exchanged in the mineral sale was extracted;
   computing, using the electronic settlement system, a settlement value for the mineral sale using the third volume measurement as a volume of mineral exchanged in the mineral sale and using the estimated market value as a price of the mineral exchanged in the mineral sale; and
   electronically settling, using the electronic settlement system, the mineral sale between the provider and the recipient by enabling electronic transfer of funds from the recipient to the provider based on the computed settlement value,
   wherein determining an estimated market value for minerals extracted from the well from which the mineral exchanged in the mineral sale was extracted comprises:
      identifying market centers serving the well from which the mineral exchanged in the mineral sale was extracted;
      receiving local cost data related to extracting minerals from the well and transporting minerals from the well to the identified market centers serving the well;
      receiving global price data including price data from each of the identified market centers serving the well;
      determining a general pattern of product flow of minerals extracted from the well to each of the identified market centers serving the well, the general pattern of product flow indicating which percentage of minerals extracted from the well travel to which of the identified market centers serving the well; and
      determining an estimated market value by performing a statistical interpolation of the local cost data and the global price data that accounts for the determined general pattern of product flow, variability of the local cost data and the global price data, and errors associated with the local cost data and the global price data.

2. The method of claim 1 wherein automatically determining a third volume measurement of the mineral exchanged in the mineral sale further comprises using a liquid, gas and solid balancing technique.

3. The method of claim 1 wherein:
   accessing an automatic resolution rule comprises accessing an automatic resolution rule indicating that differences in volume measurements received from the provider and volume measurements received from the recipient are reconciled by taking a weighted average of conflicting volume measurements; and
   based on the automatic resolution rule, automatically determining a third volume measurement of the mineral exchanged in the mineral sale comprises computing a weighted average using the first and second volume measurements and first and second weights.

4. The method of claim 1 further comprising:
automatically adjusting the first volume measurement using a first conversion rule that defines an adjustment needed to conform the first volume measurement to a basis;
automatically adjusting the second volume measurement using a second conversion rule that defines an adjustment needed to conform the second volume measurement to the basis,
wherein automatically determining a third volume measurement of the mineral exchanged in the mineral sale comprises automatically determining a third volume measurement based on the adjusted first volume measurement and the adjusted second volume measurement.

5. The method of claim 4 wherein:
automatically adjusting the first volume measurement using a first conversion rule that defines an adjustment needed to conform the first volume measurement to a basis comprises converting the first volume measurement to a unit of measurement; and
automatically adjusting the second volume measurement using a second conversion rule that defines an adjustment needed to conform the second volume measurement to the basis comprises converting the second volume measurement to the unit of measurement.

6. The method of claim 4 wherein:
automatically adjusting the first volume measurement using a first conversion rule that defines an adjustment needed to conform the first volume measurement to a basis comprises correcting the first volume measurement to account for operating conditions at which the first volume measurement was taken; and
automatically adjusting the second volume measurement using a second conversion rule that defines an adjustment needed to conform the second volume measurement to the basis comprises correcting the second volume measurement to account for operating conditions at which the second volume measurement was taken.

7. The method of claim 6 wherein:
correcting the first volume measurement to account for operating conditions at which the first volume measurement was taken comprises correcting the first volume measurement to account for a temperature at which the first volume measurement was taken; and
correcting the second volume measurement to account for operating conditions at which the second volume measurement was taken comprises correcting the second volume measurement to account for a temperature at which the second volume measurement was taken.

8. The method of claim 6 wherein:
correcting the first volume measurement to account for operating conditions at which the first volume measurement was taken comprises correcting the first volume measurement to account for a pressure at which the first volume measurement was taken; and
correcting the second volume measurement to account for operating conditions at which the second volume measurement was taken comprises correcting the second volume measurement to account for a pressure at which the second volume measurement was taken.

9. The method of claim 1 wherein accessing an automatic resolution rule defined to reconcile differences in volume measurements received from the provider and volume measurements received from the recipient in the mineral sale comprises accessing an automatic resolution rule defined based on an agreement between the provider and the recipient.

10. The method of claim 1 wherein accessing an automatic resolution rule defined to reconcile differences in volume measurements received from measurements data received from the recipient in the mineral sale comprises accessing an automatic resolution rule defined based on legal rules that govern the mineral sale.

11. The method of claim 1 wherein automatically determining a third volume measurement of the mineral exchanged in the mineral sale further comprises using a mass and heating balancing technique.

12. The method of claim 1 wherein accessing an automatic resolution rule, automatically determining a third volume measurement, determining an estimated market value, computing a settlement value, and electronically settling the mineral sale occur without human intervention.

13. The method of claim 1 wherein accessing an automatic resolution rule, automatically determining a third volume measurement, determining an estimated market value, computing a settlement value, and electronically settling the mineral sale occur without further input from the provider and the recipient.

14. The method of claim 1 wherein electronically settling the mineral sale between the provider and the recipient comprises electronically transferring the computed settlement value from an account associated with the recipient to an account associated with the provider.

15. The method of claim 14 wherein electronically transferring the computed settlement value from an account associated with the recipient to an account associated with the provider occurs without human intervention.

16. The method of claim 14 wherein electronically transferring the computed settlement value from an account associated with the recipient to an account associated with the provider occurs without further input from the provider and the recipient.

17. The method of claim 1 wherein determining an estimated market value for the mineral exchanged in the mineral sale comprises accounting for taxes, royalties, and settlement values for a variety of lease and agreement provisions.

18. The method of claim 1 wherein determining an estimated market value for the mineral exchanged in the mineral sale comprises determining an estimated market value for the mineral exchanged in the mineral sale based on a highest price in an area of the mineral sale, a most favored nations clause, a major portions pricing, a best commercially available price, and a fair market value at a well operated by the provider.

19. The method of claim 1 wherein determining an estimated market value for the mineral exchanged in the mineral sale comprises determining an estimated market value using market price data received from a source that is independent of the provider and the recipient.

20. The method of claim 1 wherein automatically determining a third volume measurement of the mineral exchanged in the mineral sale comprises automatically determining a third volume measurement of the mineral exchanged in the mineral sale, the third volume measurement being different than both the first and second volume measurements.

21. The method of claim 1 wherein receiving global price data including price data from each of the identified market centers serving the well comprises selecting monitoring points providing the global price data, wherein each monitoring point provides a respective price per volume of mineral and at least one monitoring point corresponds to an independent entity that has no relationship to ownership interests or parties having rights and responsibilities associated with the well from which the mineral exchanged in the mineral sale was extracted.

22. The method of claim 21 wherein selecting monitoring points comprises selecting monitoring points such that no single entity controls the global price data.

23. The method of claim 1 wherein determining an estimated market value by performing a statistical interpolation of the local cost data and the global price data that accounts for the determined general pattern of product flow, variability of the local cost data and the global price data, and errors associated with the local cost data and the global price data comprises determining an estimated market value per unit volume of production.

24. The method of claim 1 wherein determining an estimated market value by performing a statistical interpolation of the local cost data and the global price data that accounts for the determined general pattern of product flow, variability of the local cost data and the global price data, and errors associated with the local cost data and the global price data comprises performing a statistical interpolation that accounts for variability of the local cost data and the global price data that is characterized by minimum, maximum, average, and standard deviation statistics.

25. The method of claim 1 wherein determining an estimated market value by performing a statistical interpolation of the local cost data and the global price data that accounts for the determined general pattern of product flow, variability of the local cost data and the global price data, and errors associated with the local cost data and the global price data comprises performing a statistical interpolation using an estimated probability density function.

26. A computer readable storage medium encoded with a computer program product, the computer program product comprising instructions that, when executed, operate to cause a computer to perform operations comprising:
    receiving, from a provider of a mineral in a mineral sale, a first volume measurement of the mineral exchanged in the mineral sale;
    receiving, from a recipient of the mineral in the mineral sale, a second volume measurement of the mineral exchanged in the mineral sale, the second volume measurement being different than the first volume measurement;
    accessing an automatic resolution rule defined to reconcile differences in volume measurements received from the provider and volume measurements received from the recipient in the mineral sale;
    based on the automatic resolution rule, automatically determining a third volume measurement of the mineral exchanged in the mineral sale, the third volume measurement being different than at least one of the first and second volume measurements;
    determining an estimated market value for minerals extracted from a well from which the mineral exchanged in the mineral sale was extracted;
    computing a settlement value for the mineral sale using the third volume measurement as a volume of mineral exchanged in the mineral sale and using the estimated market value as a price of the mineral exchanged in the mineral sale; and
    electronically settling the mineral sale between the provider and the recipient by enabling electronic transfer of funds from the recipient to the provider based on the computed settlement value,
    wherein determining an estimated market value for minerals extracted from the well from which the mineral exchanged in the mineral sale was extracted comprises:
        identifying market centers serving the well from which the mineral exchanged in the mineral sale was extracted;
        receiving local cost data related to extracting minerals from the well and transporting minerals from the well to the identified market centers serving the well;
        receiving global price data including price data from each of the identified market centers serving the well;
        determining a general pattern of product flow of minerals extracted from the well to each of the identified market centers serving the well, the general pattern of product flow indicating which percentage of minerals extracted from the well travel to which of the identified market centers serving the well; and
        determining an estimated market value by performing a statistical interpolation of the local cost data and the global price data that accounts for the determined general pattern of product flow, variability of the local cost data and the global price data, and errors associated with the local cost data and the global price data.

27. The computer readable storage medium of claim 26 wherein automatically determining a third volume measurement of the mineral exchanged in the mineral sale further comprises using a liquid, gas and solid balancing technique.

28. The computer readable storage medium of claim 26 wherein:
    accessing an automatic resolution rule comprises accessing an automatic resolution rule indicating that differences in volume measurements received from the provider and volume measurements received from the recipient are reconciled by taking a weighted average of conflicting volume measurements; and
    based on the automatic resolution rule, automatically determining a third volume measurement of the mineral exchanged in the mineral sale comprises computing a weighted average using the first and second volume measurements and first and second weights.

29. The computer readable storage medium of claim 26 wherein the operations further comprise:
    automatically adjusting the first volume measurement using a first conversion rule that defines an adjustment needed to conform the first volume measurement to a basis;
    automatically adjusting the second volume measurement using a second conversion rule that defines an adjustment needed to conform the second volume measurement to the basis,
    wherein automatically determining a third volume measurement of the mineral exchanged in the mineral sale comprises automatically determining a third volume measurement based on the adjusted first volume measurement and the adjusted second volume measurement.

30. The computer readable storage medium of claim 29 wherein:
    automatically adjusting the first volume measurement using a first conversion rule that defines an adjustment needed to conform the first volume measurement to a basis comprises converting the first volume measurement to a unit of measurement; and
    automatically adjusting the second volume measurement using a second conversion rule that defines an adjustment needed to conform the second volume measurement to the basis comprises converting the second volume measurement to the unit of measurement.

31. The computer readable storage medium of claim 29 wherein:
  automatically adjusting the first volume measurement using a first conversion rule that defines an adjustment needed to conform the first volume measurement to a basis comprises correcting the first volume measurement to account for operating conditions at which the first volume measurement was taken; and
  automatically adjusting the second volume measurement using a second conversion rule that defines an adjustment needed to conform the second volume measurement to the basis comprises correcting the second volume measurement to account for operating conditions at which the second volume measurement was taken.

32. The computer readable storage medium of claim 31 wherein:
  correcting the first volume measurement to account for operating conditions at which the first volume measurement was taken comprises correcting the first volume measurement to account for a temperature at which the first volume measurement was taken; and
  correcting the second volume measurement to account for operating conditions at which the second volume measurement was taken comprises correcting the second volume measurement to account for a temperature at which the second volume measurement was taken.

33. The computer readable storage medium of claim 31 wherein:
  correcting the first volume measurement to account for operating conditions at which the first volume measurement was taken comprises correcting the first volume measurement to account for a pressure at which the first volume measurement was taken; and
  correcting the second volume measurement to account for operating conditions at which the second volume measurement was taken comprises correcting the second volume measurement to account for a pressure at which the second volume measurement was taken.

34. The computer readable storage medium of claim 26 wherein accessing an automatic resolution rule defined to reconcile differences in volume measurements received from the provider and volume measurements received from the recipient in the mineral sale comprises accessing an automatic resolution rule defined based on an agreement between the provider and the recipient.

35. The computer readable storage medium of claim 26 wherein accessing an automatic resolution rule defined to reconcile differences in volume measurements received from measurements data received from the recipient in the mineral sale comprises accessing an automatic resolution rule defined based on legal rules that govern the mineral sale.

36. The computer readable storage medium of claim 26 wherein automatically determining a third volume measurement of the mineral exchanged in the mineral sale further comprises using a mass and heating balancing technique.

37. The computer readable storage medium of claim 26 wherein electronically settling the mineral sale between the provider and the recipient comprises electronically transferring the computed settlement value from an account associated with the recipient to an account associated with the provider.

38. The computer readable storage medium of claim 26 wherein determining an estimated market value for the mineral exchanged in the mineral sale comprises accounting for taxes, royalties, and settlement values for a variety of lease and agreement provisions.

39. The computer readable storage medium of claim 26 wherein determining an estimated market value for the mineral exchanged in the mineral sale comprises determining an estimated market value for the mineral exchanged in the mineral sale based on a highest price in an area of the mineral sale, a most favored nations clause, a major portions pricing, a best commercially available price, and a fair market value at a well operated by the provider.

40. The computer readable storage medium of claim 26 wherein determining an estimated market value for the mineral exchanged in the mineral sale comprises determining an estimated market value using market price data received from a source that is independent of the provider and the recipient.

41. The computer readable storage medium of claim 26 wherein automatically determining a third volume measurement of the mineral exchanged in the mineral sale comprises automatically determining a third volume measurement of the mineral exchanged in the mineral sale, the third volume measurement being different than both the first and second volume measurements.

42. The computer readable storage medium of claim 26 wherein receiving global price data including price data from each of the identified market centers serving the well comprises selecting monitoring points providing the global price data, wherein each monitoring point provides a respective price per volume of mineral and at least one monitoring point corresponds to an independent entity that has no relationship to ownership interests or parties having rights and responsibilities associated with the well from which the mineral exchanged in the mineral sale was extracted.

43. The computer readable storage medium of claim 42 wherein selecting monitoring points comprises selecting monitoring points such that no single entity controls the global price data.

44. The computer readable storage medium of claim 26 wherein determining an estimated market value by performing a statistical interpolation of the local cost data and the global price data that accounts for the determined general pattern of product flow, variability of the local cost data and the global price data, and errors associated with the local cost data and the global price data comprises determining an estimated market value per unit volume of production.

45. The computer readable storage medium of claim 26 wherein determining an estimated market value by performing a statistical interpolation of the local cost data and the global price data that accounts for the determined general pattern of product flow, variability of the local cost data and the global price data, and errors associated with the local cost data and the global price data comprises performing a statistical interpolation that accounts for variability of the local cost data and the global price data that is characterized by minimum, maximum, average, and standard deviation statistics.

46. The computer readable storage medium of claim 26 wherein determining an estimated market value by performing a statistical interpolation of the local cost data and the global price data that accounts for the determined general pattern of product flow, variability of the local cost data and the global price data, and errors associated with the local cost data and the global price data comprises performing a statistical interpolation using an estimated probability density function.

47. An electronic settlement system comprising:
  at least one computer readable storage medium encoded with executable instructions; and at least one processor that is configured to, upon execution of the executable instructions, perform operations comprising:
- receiving, from a provider of a mineral in a mineral sale, a first volume measurement of the mineral exchanged in the mineral sale;
- receiving, from a recipient of the mineral in the mineral sale, a second volume measurement of the mineral exchanged in the mineral sale, the second volume measurement being different than the first volume measurement;
- accessing an automatic resolution rule defined to reconcile differences in volume measurements received from the provider and volume measurements received from the recipient in the mineral sale;
- based on the automatic resolution rule, automatically determining a third volume measurement of the mineral exchanged in the mineral sale, the third volume measurement being different than at least one of the first and second volume measurements;
- determining an estimated market value for minerals extracted from a well from which the mineral exchanged in the mineral sale was extracted;
- computing a settlement value for the mineral sale using the third volume measurement as a volume of mineral exchanged in the mineral sale and using the estimated market value as a price of the mineral exchanged in the mineral sale; and
- electronically settling the mineral sale between the provider and the recipient by enabling electronic transfer of funds from the recipient to the provider based on the computed settlement value,
- wherein determining an estimated market value for minerals extracted from the well from which the mineral exchanged in the mineral sale was extracted comprises:
  - identifying market centers serving the well from which the mineral exchanged in the mineral sale was extracted;
  - receiving local cost data related to extracting minerals from the well and transporting minerals from the well to the identified market centers serving the well;
  - receiving global price data including price data from each of the identified market centers serving the well;
  - determining a general pattern of product flow of minerals extracted from the well to each of the identified market centers serving the well, the general pattern of product flow indicating which percentage of minerals extracted from the well travel to which of the identified market centers serving the well; and
  - determining an estimated market value by performing a statistical interpolation of the local cost data and the global price data that accounts for the determined general pattern of product flow, variability of the local cost data and the global price data, and errors associated with the local cost data and the global price data.

48. The device of claim 47 wherein the processor is configured to automatically determine a third volume measurement of the mineral exchanged in the mineral sale using a liquid, gas and solid balancing technique.

49. The device of claim 47 wherein the processor is configured to:
- access an automatic resolution rule by accessing an automatic resolution rule indicating that differences in volume measurements received from the provider and volume measurements received from the recipient are reconciled by taking a weighted average of conflicting volume measurements; and
- automatically determine a third volume measurement of the mineral exchanged in the mineral sale by computing a weighted average using the first and second volume measurements and first and second weights.

50. The device of claim 47 wherein the processor is configured to:
- automatically adjust the first volume measurement using a first conversion rule that defines an adjustment needed to conform the first volume measurement to a basis;
- automatically adjust the second volume measurement using a second conversion rule that defines an adjustment needed to conform the second volume measurement to the basis,
- wherein the processor is configured to automatically determine a third volume measurement of the mineral exchanged in the mineral sale by automatically determining a third volume measurement based on the adjusted first volume measurement and the adjusted second volume measurement.

51. The device of claim 50 wherein the processor is configured to:
- automatically adjust the first volume measurement using a first conversion rule that defines an adjustment needed to conform the first volume measurement to a basis by converting the first volume measurement to a unit of measurement; and
- automatically adjust the second volume measurement using a second conversion rule that defines an adjustment needed to conform the second volume measurement to the basis by converting the second volume measurement to the unit of measurement.

52. The device of claim 50 wherein the processor is configured to:
- automatically adjust the first volume measurement using a first conversion rule that defines an adjustment needed to conform the first volume measurement to a basis by correcting the first volume measurement to account for operating conditions at which the first volume measurement was taken; and
- automatically adjust the second volume measurement using a second conversion rule that defines an adjustment needed to conform the second volume measurement to the basis by correcting the second volume measurement to account for operating conditions at which the second volume measurement was taken.

53. The device of claim 52 wherein the processor is configured to:
- correct the first volume measurement to account for operating conditions at which the first volume measurement was taken by correcting the first volume measurement to account for a temperature at which the first volume measurement was taken; and
- correct the second volume measurement to account for operating conditions at which the second volume measurement was taken by correcting the second volume measurement to account for a temperature at which the second volume measurement was taken.

54. The device of claim 52 wherein the processor is configured to:
- correct the first volume measurement to account for operating conditions at which the first volume measurement was taken by correcting the first volume measurement to account for a pressure at which the first volume measurement was taken; and correct the second volume measurement to account for operating conditions at which the second volume measurement was taken by correcting the second volume measurement to account for a pressure at which the second volume measurement was taken.

55. The device of claim 47 wherein the processor is configured to access an automatic resolution rule defined to reconcile differences in volume measurements received from the provider and volume measurements received from the recipient in the mineral sale by accessing an automatic resolution rule defined based on an agreement between the provider and the recipient.

56. The device of claim 47 wherein the processor is configured to access an automatic resolution rule defined to reconcile differences in volume measurements received from measurements data received from the recipient in the mineral sale by accessing an automatic resolution rule defined based on legal rules that govern the mineral sale.

57. The device of claim 47 wherein the processor is configured to automatically determine a third volume measurement of the mineral exchanged in the mineral sale using a mass and heating balancing technique.

58. The device of claim 47 wherein the processor is configured to electronically settle the mineral sale between the provider and the recipient by electronically transferring the computed settlement value from an account associated with the recipient to an account associated with the provider.

59. The device of claim 47 wherein the processor is configured to determine an estimated market value for the mineral exchanged in the mineral sale by accounting for taxes, royalties, and settlement values for a variety of lease and agreement provisions.

60. The device of claim 47 wherein the processor is configured to determine an estimated market value for the mineral exchanged in the mineral sale by determining an estimated market value for the mineral exchanged in the mineral sale based on a highest price in an area of the mineral sale, a most favored nations clause, a major portions pricing, a best commercially available price, and a fair market value at a well operated by the provider.

61. The device of claim 47 wherein the processor is configured to determine an estimated market value for the mineral exchanged in the mineral sale by determining an estimated market value using market price data received from a source that is independent of the provider and the recipient.

62. The device of claim 47 wherein the processor is configured to automatically determine a third volume measurement of the mineral exchanged in the mineral sale by automatically determining a third volume measurement of the mineral exchanged in the mineral sale, the third volume measurement being different than both the first and second volume measurements.

63. The device of claim 47 wherein the processor is configured to receive global price data including price data from each of the identified market centers serving the well by selecting monitoring points providing the global price data, wherein each monitoring point provides a respective price per volume of mineral and at least one monitoring point corresponds to an independent entity that has no relationship to ownership interests or parties having rights and responsibilities associated with the well from which the mineral exchanged in the mineral sale was extracted.

64. The device of claim 63 wherein the processor is configured to select monitoring points by selecting monitoring points such that no single entity controls the global price data.

65. The device of claim 47 wherein the processor is configured to determine an estimated market value by performing a statistical interpolation of the local cost data and the global price data that accounts for the determined general pattern of product flow, variability of the local cost data and the global price data, and errors associated with the local cost data and the global price data by determining an estimated market value per unit volume of production.

66. The device of claim 47 wherein the processor is configured to determine an estimated market value by performing a statistical interpolation of the local cost data and the global price data that accounts for the determined general pattern of product flow, variability of the local cost data and the global price data, and errors associated with the local cost data and the global price data by performing a statistical interpolation that accounts for variability of the local cost data and the global price data that is characterized by minimum, maximum, average, and standard deviation statistics.

67. The device of claim 47 wherein the processor is configured to determine an estimated market value by performing a statistical interpolation of the local cost data and the global price data that accounts for the determined general pattern of product flow, variability of the local cost data and the global price data, and errors associated with the local cost data and the global price data by performing a statistical interpolation using an estimated probability density function.

* * * * *

UNITED STATES PATENT AND TRADEMARK OFFICE
CERTIFICATE OF CORRECTION

| | | |
|---|---|---|
| PATENT NO. | : 7,676,420 B1 | Page 1 of 1 |
| APPLICATION NO. | : 10/465296 | |
| DATED | : March 9, 2010 | |
| INVENTOR(S) | : Thomas J. Agnew et al. | |

It is certified that error appears in the above-identified patent and that said Letters Patent is hereby corrected as shown below:

On the Title page, Item (56), lines 2-3, under "OTHER PUBLICATIONS", delete "The Effect of the United If the The Effect of the United States' gGranting" and insert -- The Effect of the United States Granting --, therefore.

Signed and Sealed this
Fourteenth Day of February, 2012

David J. Kappos
*Director of the United States Patent and Trademark Office*